(12) United States Patent
Aleksander et al.

(10) Patent No.: US 11,917,049 B2
(45) Date of Patent: *Feb. 27, 2024

(54) METHOD FOR REGISTERING OF DATA AS A DIGITAL FILE IN A BLOCKCHAIN DATABASE

(71) Applicant: Lukka Poland Sp. z o.o., Torun (PL)

(72) Inventors: Pawel Zygmunt Aleksander, Kobylniki (PL); Pawel Kuskowski, Golub-Dobrzyn (PL); Jakub Fijolek, Bydgoszcz (PL)

(73) Assignee: LUKKA POLAND SP. Z O.O., Torun (PL)

( * ) Notice: Subject to any disclaimer, the term of this patent is extended or adjusted under 35 U.S.C. 154(b) by 618 days.

This patent is subject to a terminal disclaimer.

(21) Appl. No.: 17/250,128

(22) PCT Filed: Mar. 14, 2019

(86) PCT No.: PCT/EP2019/056460
§ 371 (c)(1),
(2) Date: Dec. 2, 2020

(87) PCT Pub. No.: WO2019/233646
PCT Pub. Date: Dec. 12, 2019

(65) Prior Publication Data
US 2021/0232555 A1 Jul. 29, 2021

(30) Foreign Application Priority Data

Jun. 7, 2018 (EP) .................................... 18461565
Sep. 19, 2018 (EP) .................................... 18195583
Feb. 26, 2019 (EP) .................................... 19159419

(51) Int. Cl.
*H04L 9/06* (2006.01)
*G06F 16/23* (2019.01)
(Continued)

(52) U.S. Cl.
CPC .......... *H04L 9/0637* (2013.01); *G06F 16/152* (2019.01); *G06F 16/219* (2019.01);
(Continued)

(58) Field of Classification Search
CPC .... H04L 9/3239; H04L 9/3247; H04L 9/3297
See application file for complete search history.

(56) References Cited

U.S. PATENT DOCUMENTS 9,998,150 B1 * 6/2018 Lazier .................. G06F 1/3268
2016/0283920 A1 9/2016 Fisher et al.
(Continued)

FOREIGN PATENT DOCUMENTS

WO WO2018/024062 A1 2/2018
WO WO2018/032890 A1 2/2018

OTHER PUBLICATIONS

WIPO, EP International Search Authority, International Search Report and Written Opinion dated Jul. 9, 2019 in International Patent Application No. PCT/EP2019/056460, 12 pages.
(Continued)

*Primary Examiner* — William S Powers
(74) *Attorney, Agent, or Firm* — MASUVALLEY & PARTNERS; Peter Martinez

(57) ABSTRACT

The invention comprises a method for registering of a digital document as a digital file in a blockchain database, in which database transactions are constructed of standard data containers which may have a fixed size, in a system comprising one or more storage nodes for storing at least part of the blockchain database, one or more approval nodes for approving transactions in said blockchain database and a first computer for generating transactions in said blockchain database, said computer having access to said blockchain database and having access to a first private key. The invention also comprises a computer program product com-
(Continued)

prising program code stored on a computer readable medium, said program code comprising computer instructions for performing said method.

17 Claims, 1 Drawing Sheet

(51) Int. Cl.
  *G06F 16/14* (2019.01)
  *H04L 9/32* (2006.01)
  *G06F 16/21* (2019.01)
  *H04L 9/00* (2022.01)
(52) U.S. Cl.
  CPC ........ *G06F 16/2379* (2019.01); *H04L 9/0643* (2013.01); *H04L 9/3239* (2013.01); *H04L 9/3247* (2013.01); *H04L 9/3297* (2013.01); *H04L 9/50* (2022.05)

(56) References Cited

U.S. PATENT DOCUMENTS

| | | | | |
|---|---|---|---|---|
| 2017/0161439 | A1* | 6/2017 | Raduchel | G16H 10/60 |
| 2017/0373849 | A1* | 12/2017 | Donner | H04L 9/30 |
| 2018/0130158 | A1* | 5/2018 | Atkinson | G06F 21/6209 |
| 2018/0139056 | A1* | 5/2018 | Imai | H04L 9/3247 |
| 2018/0167217 | A1* | 6/2018 | Brady | H04L 67/10 |
| 2018/0349572 | A1 | 12/2018 | Chen et al. | |
| 2019/0057115 | A1 | 2/2019 | Liu et al. | |

OTHER PUBLICATIONS

Zheng Pelin et al., "A Detailed and Real-Time Performance Monitoring Framework for Blockchain Systems", 2018 IEEE/ACM 40$^{th}$ International Conference on Software Engineering: Software Engineering in Practice Track(ICSE-SEIP), ACM, May 25, 2018, pp. 134-143.

Pasquale Forte et al., "Beyond Bitcoin—Part I: A critical look at blockchain-based systems", International Assciation for Cryptologic Research, vol. 20151202:213043, Dec. 1, 2015, pp. 1-34.

Gipp Bela et al., "CryptSubmit: Introducing Securely Timestamped Manuscript Submission and Peer Review Feedback Using the Blockchain", 2017 ACM/IEEE Joint Conference on Digital Libraries(JCDL), IEEE, Jun. 19, 2017, pp. 1-4.

* cited by examiner

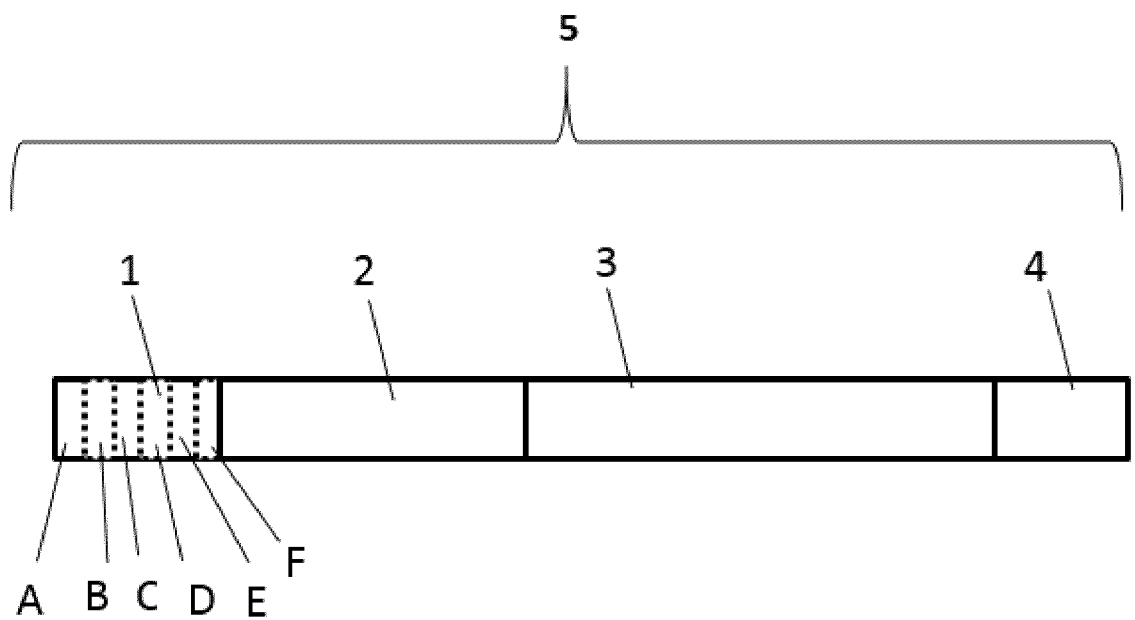

METHOD FOR REGISTERING OF DATA AS A DIGITAL FILE IN A BLOCKCHAIN DATABASE

RELATED APPLICATIONS

This application is the U.S. National Phase of and claims priority to International Patent Application No. PCT/EP2019/056460, International filing Date Mar. 14, 2019, entitled A Method for Registering Of Data As A Digital file In A Blockchain Database; which claims benefit of European Application No. 18461565.6 filed Jun. 7, 2018 entitled A Method for Registration Of Data In A Blockchain Database And A Method for Verifying Data; European Application No. 18195583.2 filed Sep. 19, 2018 entitled A Method for Registration Of Data In A Blockchain Database And A Method for Verifying Data; and European Application No. 19159419.1 filed Feb. 26, 2019 entitled A Method for Registering Of A Data As A Digital file In A Blockchain Database; all of which are incorporated herein by reference in their entireties.

FIELD OF THE INVENTION

The invention generally relates to data registration and verification methods, in particular, to a method for registration of data in a database in accordance with the blockchain standard, verifying the origin, contents and timestamp of the registered data and transferring such data. The invention relates also to an application of these methods to handle registration and verification of any type of digital data. The present invention further relates to a computer readable storage medium comprising computer program code instructions for implementing these methods.

BACKGROUND

A telecommunication system configured for storing and exchanging data between device operatively connected to the peer-to-peer telecommunications system is described in WO2018032890A1 document, which discloses a method and system for distributing a digital content. The method comprises: a content device receiving a download request sent by a download client, the download request comprising an upload transaction ID and a license transaction ID of a content file to be downloaded; the content device determining, according to the upload transaction ID and the license transaction ID, whether the download client has license information for downloading the content file, and if so, sending the content file to the download client; after the content file has been distributed, the content device sending a download transaction request to a content transaction processing device, the download transaction request comprising download information; the content transaction processing device receiving the download transaction request, determining that the download information is valid, generating a download transaction, and sending the download transaction to a blockchain processing device; and the blockchain processing device receiving the download transaction, and adding the download transaction to a blockchain. The content device sends a content file to a download client only when the download client has download authorization, thereby limiting a distribution range of a content file. In the embodiment of the present invention, there are multiple copyright management or content distribution processes, such as uploading and downloading of content files, licensing, and the like.

Document US20160283920A1 discloses a method for authenticating a chain of custody utilizing blockchain technology, whereby digital evidence or other digital content is acquired and then hashed to produce a hash fingerprint/signature and then immediately or instantly submitting said hash fingerprint/signature to the blockchain using the blockchain network protocol, forming an immediate verifiable chain of custody without human interaction or requiring a trusted third party. According to US20160283920A1, a hash of a document is stored in a blockchain database, thereby allowing for future verification of the content of this document. However, the information about the origin/owner of the document and about relevant moment in time, when said content of the document was hashed (timestamp) is missing in this solution.

A copyright authorisation management method and system is described in WO2018024062A1. The method comprises: obtaining information of a copyright owner; sending a contract determination notification to a corresponding copyright owner client according to the information of the copyright owner, the contract determination notification carrying copyright related information of an authorised work; receiving transaction information returned by the copyright owner client, the transaction information including contract information determined by the copyright owner according to the copyright related information; obtaining an effective contract transaction according to the transaction information, the effective contract transaction including a signature satisfying a preset number of rules; persisting the effective contract transaction in a blockchain. The copyright authorisation management method and system implement the online signing of contracts and the persistence of signed contracts on the basis of blockchains, thereby increasing copyright authorisation efficiency, and ensuring that contracts are unique, trustworthy and tamper-proof.

US patent application no. US20180139056A1 discloses a system and a method for authenticating a user having access to a device connected to a blockchain network, for performing the following operations: recording data of a specific source and contents in public blockchain together with information identifying said user and a timestamp; recording additional related data in a distributed file sharing network and accessing the data recoded in said distributed file sharing network as well as recording the access event in public blockchain. User authentication methods disclosed in US20180139056A1 are publicly known user authentication methods based on blockchain technologies. US20180139056A1 discloses a method which enables registration in a blockchain database of any data (digital file) and its characteristics, for example such as contents, author (origin) or timestamp of said data. US20180139056A1 handles only data (digital file) coming from a specific source (called IoT Gateway or 'Client Terminal'). However, US20180139056A1 does not disclose or suggest to store in the blockchain database: a) as far as the contents of the file is concerned: a hash of said digital file (or the file itself) and b) as far as the origin of the file is concerned: a digital signature of a hash of the digital file (which couples the contents of the file with the origin of this file). Moreover, in order to register any data according to US20180139056A1—the user must have an access to blockchain network. Also, the system operator in US20180139056A1 "sees" the contents of the data being registered, unless the data is encrypted.

The present invention provides a method for registering the origin, content and timestamp of a digital file of any source and any content in public or private blockchain networks, by any internet user (in particular—by a user not having an access to blockchain network). The present invention "feeds" desired information (relating to the contents and the origin of the digital file)—after appropriate compilation—into a single blockchain transaction. This transaction is registered in the blockchain network by a system operator, independent from the user, using standard procedures for registering blockchain transactions. The hash of the digital file is signed with a different key than the key used to sign the blockchain transaction itself. Owing to this, the method according to the present invention is available to any internet user (in particular—to a user not having an access to blockchain network) and the system operator does not "see" the data registered (or verified). It must be noted that according to the present invention—all the three features of the digital file, which are finally registered in the blockchain database (i.e. characterizing the contents, the origin and the timestamp of said file)—relate to one and the same digital file.

None of the prior art solutions provides a reliable method having advantages as listed above.

SUMMARY

The present invention provides a method for registration data, which allows to securely store in a blockchain database at the same time information about the contents of data, information about the origin/owner of the data and information about the timestamp of registration of data of this contents from this origin/owner. The invention also provides a data verification method, based on this secure data registration method, allowing for verification of data file with respect to the contents, origin/owner and timestamp of registration. The methods are carried out in a telecommunication system configured for registration and exchanging data between devices connected to the telecommunication system.

A telecommunication system configured for registration and exchanging data between devices connected to the telecommunications system can be formed by at least two nodes of said telecommunication system. Said node of the communication system is a telecommunication device e.g. computer, configured for computing data operations e.g. for storing, exchanging, processing. A frontend device, typically a user equipment, is a first computer device with a user interface configured for user data processing, like creating, copying, receiving or sending data in form of digital files (throughout this document called also "digital documents", "digital good", "data" or "test digital documents", "test digital good", "test data"). Said first computer is connected to one or more nodes of the telecommunication system configured for storing data and said first computer is connected to one or more approval node configured for processing data. Nodes configured for storing data and for processing data may be (but do not have to be) the same nodes. Said database is configured for adding new information in a form of a record to existing records, without deleting or overwriting any previous records. This is a so-called incremental and immutable database. The well-known blockchain database is an example of such a database. Each record is a data packet having its size and structure (in many blockchain standards: a fixed size and a fixed structure), records are stored in transactions, transactions are stored in blocks and database made from blocks forms a blockchain. Said block contains so-called transactions generated by the computer, timestamp and information about the preceding block in the blockchain. Said transaction contains integer number of data containers, which—in many blockchain standards—have their standard, fixed size. Specifically, in blockchain standards such as bitcoin or dash the standard data container has its standard, fixed size.

The blockchain is a digitized, decentralized, ledger of all transactions. Constantly growing as 'completed' blocks (the most recent transactions) are recorded and added to it in a chronological order, it allows market participants to keep track of transactions without central recordkeeping. Any node (a computer connected to the network) may get a copy of the blockchain, which is downloaded automatically. The network synchronizes the content of the database between the nodes so that each node possesses the same information encompassing all completed blocks.

Originally developed as the accounting method for the virtual currency bitcoin, blockchains—which use what's known as distributed ledger technology (DLT)—are appearing in a variety of commercial applications today. Currently, the technology is primarily used to verify transactions, within digital currencies though it is possible to digitize, code and insert practically any data into the blockchain. Doing so creates immutable records that "practically" cannot be changed. Furthermore, the record's authenticity can be verified by the entire community using the blockchain instead of a single centralized authority.

A block is a part of the blockchain, which records at least part of the recent transactions. Sometimes a block may be empty—despite transactions awaiting to be recorded. Once completed, the block is permanently recorded into the blockchain. Each time a block gets completed, a new one is generated and awaits for completion (cryptographic approval of its contents) by network nodes. The number of blocks constantly increases over time. Blocks are connected to each other (like links in a chain) in proper linear, chronological order. Every block contains a hash of the previous block. The blockchain has complete information about all transactions right from the genesis block to the most recently completed block.

The blockchain was designed so that these transactions are immutable, meaning they cannot be deleted or changed. The blocks are added through cryptography, ensuring that they remain meddle-proof: the data can be distributed, copied, but not altered. However, the ever-growing size of the blockchain is considered by some to be a problem, creating issues of storage and synchronization.

[http://scet.berkeley.edu/wp-content/uploads/AIR-2016-blockchain.pdf]

According to the invention, a method for registering of a digital document as a digital file in a blockchain database, in which database transactions are constructed of standard data containers which may have a fixed size, in a system comprising one or more storage nodes for storing at least part of the blockchain database, one or more approval nodes for approving transactions in said blockchain database and a first computer for generating transactions in said blockchain database, said computer having access to said blockchain database and having access to a first private key, comprises the following steps:

a) providing a first set of data, relating to the contents of the digital file;
b) providing a second set of data, relating to the origin of the digital file;
c) generating a third set of data by merging the first set of data, the second set of data, optionally a header and optionally a suffix into a data frame, wherein the header may contain information about the structure of the third set of data, about the size of the first set of data, while the size of the suffix is adjusted such that the size of the data frame is a multiple of the size of the standard data container used in said blockchain database;

d) dividing the third set of data into an integer number N≥1 of parts of equal size, said size corresponding to the size of the standard data container used in said blockchain database;

e) generating—by said first computer or an intermediary computer connected to the first computer and said one or more of the approval nodes—a single blockchain transaction for all the N parts obtained in the step d), signing the transaction by said first private key and sending the transaction and a first public key matching the said first private key to said one or more approval nodes for approval;

f) obtaining approval for the transaction from said one or more approval nodes;

g) registering the transaction approved in the step f) in a block of the blockchain database with a timestamp of registration by the one or more storage nodes, wherein the second set of data comprises a digital signature of a hash of the digital file and wherein registering of the digital document as the digital file in the blockchain database is done by a first entity and the digital document is transmitted from the first entity to a second entity.

According to the present inventive method, the term "a digital document such as a digital file" relates to any digital data. In particular, such data may be a document other than a blockchain transaction or a part of it.

The third set of data, generated in step c), does not require any particular order of data. By way of example only, the third set of data may be compiled by merging the header, the first set of data, the second set of data and optionally the suffix into a data frame, starting with the header, followed by the first set of data, followed by the second set of data and optionally ending with the suffix. However, any other order is acceptable—as long as the third set of data comprises the first set of data and the second set of data.

As far as step e) is concerned, the knowledge on how to construct a blockchain transaction carrying specific set of data is publicly available and results from the rules encoded in protocol of particular blockchain network. For example, the source code of bitcoin blockchain can be downloaded from the website https://bitcoin.org/. This source code determines all requirements necessary for executing any type of bitcoin transaction.

The third set of data is divided into N parts if the length of the third set of data exceeds the size of a standard data container of a given blockchain database. Dividing the third set of data into N parts allows recording the third set of data in one blockchain transaction consisting of multiple data containers. Moreover, the system operator, who records the transaction (including the first set of data), in a blockchain database, knows the structure of the third set of data and this structure is published by the system operator, so that verification of data can be performed not only through the system operator, but independently. The structure of the data frame (i.e. of the third set of data) may be known to the system operator for example from the header. The information about the structure of the third set of data may relate in particular to the content, the order and/or the size of elements in the third set of data.

The term "data container"/"standard data container" is a the part of blockchain transaction of a specified length resulting from blockchain protocol, where the issuer of the transaction can input the data intended to be recorded in the blockchain database with this transaction. One blockchain transaction may contain multiple data containers of a specified length. By way of example: the standard data container in the bitcoin blockchain is commonly referred as "scriptPubKey" (or "pkScript"), which is a part of "Txout-script" (also referred as "Output segment") and may contain any data of a specified length.

In one embodiment, the first set of data may be the digital file itself.

In another embodiment, the first set of data may be a hash of the digital file, preferably generated by the SHA256 algorithm, the SHA3-256 algorithm, or the SHA3-512 algorithm.

In such case, preferably, the first set of data is a hash of the digital file generated by the SHA256 algorithm and has the size of 64 digits, preferably 64 hex digits or a multiple thereof or is a hash of the digital file generated by the SHA3-256 algorithm and has the size of 64 digits, preferably 64 hex digits or a multiple thereof, or is a hash of the digital file generated by the SHA3-512 algorithm and has the size of 128 digits, preferably 128 hex digits or a multiple thereof.

The digital signature of the hash of the digital file, comprised in the second set of data, is preferably calculated as a function of: the hash of the digital file and a private key corresponding to the origin of the digital file. A public key corresponding to said private key can be optionally added to the second set of data. Said private key corresponding to the origin of the digital file may be (and in most cases—is) different from said first private key.

If the second set of data is the digital signature of the hash of the digital file—then preferably the second set of data has the size of 130 digits, preferably 130 hex digits.

The header is optional and for most cases the header does not have to be included in the third set of data. The header is convenient and recommended in case the number of signatories of the digital file or digital files is greater than one or in case the number of hashes of digital files that should be stored in the data frame is greater than one. In such case, the header should contain the number of signatures of hashes of the digital file or digital files and the number of hashes of the digital files, stored in the third set of data. The number of signatures of hashes of the digital file or digital files may refer to the number of signatories of the digital file and the number of hashes of the digital files may relate to the number of digital files, intended to be registered in the blockchain database with a single blockchain transaction. In any case the system operator must know the structure of the data frame (i.e. of the third set of data) to be able to create it properly and read it properly later on. The structure of the data frame (i.e. of the third set of data) may be known to the system operator for example from the header. The header may contain information about the size of the first set of data. The information about the structure of the third set of data may relate in particular to the content, the order and/or the size of elements in the third set of data.

Preferably, the header has the size of 6 digits, preferably 6 hex digits and comprises the following information: version of the digital file, type of the digital file, the number of hashes that should be stored in said data frame, the number of signatories of the digital file.

Preferably, the blockchain database is a dash database or a bitcoin database, and the standard data container has the size of 40 hex digits.

In a preferred embodiment of the present invention, the following information is stored in a separate database, in relation to the first set of data: the transaction hash corresponding to the transaction generated in the step e), the block hash, the block height and the block timestamp of registration, corresponding to the block mentioned in the step g).

In one preferred option, the inventive method further comprises the steps of:
- h1) providing a test digital file by a user, preferably through a web browser;
- i1) calculating a hash of the test digital file;
- j1) checking if the hash of the test digital file matches the first set of data being the hash of the digital file, previously stored in the block of the blockchain database as the result of the method according to the digital file registration procedure as described above, and in the affirmative sending confirmation to the user, preferably through the web browser, said confirmation comprising information relating to the contents of the test digital file and optionally comprising information relating to the origin of the test digital file and/or information relating to the block timestamp of registration.

In another preferred option, the inventive method further comprises the steps of:
- h2) providing a test digital file by a user, preferably through a web browser;
- i2) calculating a hash of the test digital file;
- j2) checking if the hash of the test digital file matches the first set of data being the hash of the digital file, previously stored in said separate database as the result of the digital file registration procedure as described above (including storing information in said separate database), and in the affirmative sending confirmation to the user, preferably through the web browser, said confirmation comprising information relating to the contents of the test digital file and optionally comprising information relating to the origin of the test digital file and/or information relating to the block timestamp of registration.

The two options described in the two foregoing paragraphs provide thus a procedure for verification of any digital document/digital file.

In such case, preferably, if the hash of the test digital file matches more than one first sets of data in the step j1) or j2) respectively, then only information corresponding to the transaction bearing one selected timestamp of registration, preferably the oldest timestamp of registration, is used as the basis to generate the confirmation to the user in the step j1) or j2) respectively.

In still another preferred option, the invention provides a method comprising:
- generating the digital document by the first entity,
- registering of the digital document as the digital file by the first entity in the blockchain database, according to the digital document registration procedure as described above,
- transmitting the digital document from the first entity to the second entity, optionally through a user terminal, and
- verifying the digital document as the test digital file by the second entity according to the digital document verification procedure as described above.

Preferably, the digital document contains personal data of a client and the client's transaction history, preferably the digital file being a bank statement or a similar document containing personal data of the client and transactions history on a bank account of the client.

The preferred options described in the two foregoing paragraphs provide thus a method for transmitting a digital document of a credible contents, source and timestamp between two entities. The method applies to any digital document/digital file.

The invention also relates to a computer program product comprising program code stored on a computer readable medium, said program code comprising computer instructions for performing the methods defined above.

BRIEF DESCRIPTION OF DRAWINGS

FIG. 1 shows a third set of data 5 according to an embodiment of the invention, in which case the third set of data 5 is a data frame comprising a header 1, a first set of data 2, a second set of data 3 and a suffix 4, wherein the header 1 further comprises the first digit (A), containing information about the version of the digital file, the second digit (B), relating to a type of the data, the third (C) and the fourth digits (D), containing information about the number of hashes of the digital file that should be stored in this frame, the fifth digit (E), informing about the number of digital file owners and the sixth digit (f), for storing some additional information not relevant in this embodiment. The example provides a particular order of data in the data frame. However, any other order is acceptable—as long as the third set of data 5 comprises the first set of data 2 and the second set of data 3. The example comprises the header 1 and the suffix 4, but in general each of these elements is optional.

DETAILED DESCRIPTION

The present invention proposes a method for registration of data in a blockchain database. As mentioned before, the blockchain database is a commonly known example of an incremental database, in which transactions are constructed of standard data containers which may have a fixed size. The blockchain database is known to be implemented in a system comprising one or more storage nodes for storing at least part of the blockchain database and one or more approval nodes approving transactions in said blockchain database (commonly referred to as "miners"). Nodes configured for storing data and for processing data may be (but do not have to be) the same nodes. Also, there is a computer for generating transactions in the blockchain database, said computer having access to said blockchain database and nodes. This computer also has access to a private key of the system operator (a first private key, or node's private key).

The inventive method comprises the following steps:
- a) Providing a first set of data 2, relating the contents of a digital file. The term "digital file" encompasses any "digital good", i.e. it can be a data file with a well-established data structure, such as a file of one of standard formats (e.g. pdf, doc, mp3, avi, jpeg etc.) or any other set or string of data. The term "fist set of data relating to the contents of the digital file" encompasses information related to the contents of the digital file. It can be in particular the digital file itself, a part of it or a hash of this digital file, said hash being obtained by any known method (details of hash functions are discussed further in text). The method relates to any "digital document"/"digital file".
- b) Providing a second set of data 3, relating to the origin of said digital file. The origin refers to a source of the file, e.g. IP address of a node, blockchain address, ID or name of a user who is the author or the owner of said digital file. The second set of data 3 comprises a digital signature of a hash of the digital file, preferably calculated as a function of: the hash of the digital file and private key corresponding to the origin of the digital file (a second private key, i.e. a private key of the owner (or: the holder) of the digital file). The size of the second set of data 3 is related to how much information it stores, how long the hash of the digital file is and how many hashes it stores, how long the digital signature is and how many digital signatures it stores. For example, using the SHA3-256 hash function—the hash will be 64 digits long and using the SHA3-512—it will be 128 digits long. A public key corresponding to said second private key may be optionally added to the second set of data 3.

c) generating a third set of data 5 by merging the two previously mentioned data sets (i.e. the first set of data 2 and the second set of data 3) and optionally adding a header 1 and optionally adding a suffix 4. The third set of data 5 is a data frame with the header 1, the first set of data 2, the second set of data 3 and the suffix 4. This means that the third set of data 5 has a structure—i.e. a specific order of data. By way of example, it starts with the header 1, followed by the first set of data 2, followed by the second set of data 3 and ends with the suffix 4, if necessary. The header 1 has 6 hex digits, wherein the first digit (A) contains information about the version of the digital file, the second digit (B) relates to the type of the digital file, the third (C) and fourth digits (D) contain information about the number of hashes of the digital file that should be stored in this frame, the fifth digit (E) informs about number of digital file owners and the sixth digit (f) is for registration some additional information, not relevant in this embodiment. The suffix 4 is added to the data frame to make it possible to divide the data frame (i.e. the third set of data 5) into an integer number of parts of equal size. Thus, the size of the suffix 4 is adjusted such that the total size of the data frame (i.e. of the third set of data 5) is a multiple of the size of the standard data container used in said blockchain database. For example, if in the bitcoin database the container has 40 digits, then the frame size must be a multiple of 40, e.g. must be equal to 40, 80, 120 etc. The contents of the suffix 4 is not relevant in the present embodiment (by way of example it may be in the form of zeros or digits, or strings). The particular order of data in the data frame described in this paragraph is given as an example. Any other order is acceptable—as long as the third set of data 5 comprises the first set of data 2 and the second set of data 3. The example comprises the header 1 and the suffix 4, but in general each of these elements is optional.

In any case the system operator must know the structure of the data frame (i.e. of the third set of data 5) to be able to create it properly and read it properly later on (for example to perform verification). The structure of the data frame may be known to the system operator for example from the header.

For example, generating such a data frame in a bitcoin blockchain database is carried out as follows: In this embodiment the aforementioned third set of data 5 is a data frame having the following parts: 6 digits header 1+64 digits hash as the first set of data 2+130 digits digital signature as the second set of data 3, which gives 200 digits, 200 is a multiple of 40 (standard bitcoin container size), so there is no need to add a suffix 4.

In another embodiment, for a hash calculated using the SHA3-512 algorithm, the third set of data 5 is a data frame having the following parts: 6 digits header 1+128 digits hash as the first set of data 2+130 digits digital signature as the second set of data 3, which gives 264 digits, which is not a multiple of 40 (standard bitcoin container size), so the suffix 4 needs to be added and must have the size of 16 digits. In this embodiment the suffix 4 is a string of data. In this operation 280 digits-long frame, which is a multiple of 40, is generated as the third set of data 5. For this third set of data 5 the number N of integer parts of the size of the standard container for bitcoin blockchain is 7.

d) dividing the third set of data 5 into an integer number $N \geq 1$ of parts of equal size, said size corresponding to the size of the standard data container (corresponding to the blockchain database). As it was mentioned above, the third set of data 5 is then divided to an integer number of parts, having a fixed, equal size. The size results from the type of the blockchain database. For bitcoin and dash blockchain databases the standard container size is 40 digits. In the aforementioned embodiments the third set of data 5 is divided:

in the first embodiment—into N=5 parts of 40 digits,
in the second embodiment—in to N=7 parts of 40 digits.

e) generating—by said first computer or an intermediary computer connected to the first computer and said one or more of the approval nodes—a single blockchain transaction for all the N parts obtained in the step d), signing the transaction by said first private key and sending the transaction and a first public key matching the said first private key to said one or more approval nodes for approval. Said generating of the transaction encompasses also a situation in which the transaction is generated by the intermediary computer, which gets the contents needed for generating the transaction from said first computer. Said sending the transaction may be carried out directly (between the first computer and the one or more approval nodes) or indirectly—i.e. from the first computer through API and back-end to the one or more approval nodes. The transaction then propagates in the network as approval nodes are broadcasting it—sharing information with other nodes. Generated transaction is now known to more than one approval node to maximize consensus and security level.

f) obtaining approval for the transaction from said one or more approval nodes. Approval nodes send and propagate the approval information to the network.

g) registering the transaction approved in the step f) in a block of the blockchain database with the block creation timestamp (i.e. the timestamp of registration) by the one or more storage nodes. The approved transaction is put into the block of the blockchain database. Information about a new record added to the blockchain (new block) is spread through the network. This way all information about the digital good has been stored in the blockchain database, along with information about its source/origin/owner and a timestamp of registration.

Registering of the digital document as the digital file in the blockchain database is done by a first entity and the digital document is transmitted from the first entity to a second entity.

In one embodiment of the method according to the invention, the first set of data 2 is the digital file. The term "digital file" encompasses any "digital good", i.e. it can be a data file with a well-established data structure, such as a file of one of standard formats (e.g. pdf, doc, mp3, avi, jpeg etc.) or any other set or string of data. The term "first set of data 2 relating to the contents of the digital file" encompasses information related to the contents of the digital file.

It can be in particular the digital file itself, a part of it or a hash of this digital file, said hash being obtained by any known method (details of hash functions are discussed further in text).

In another embodiment of the method according to the invention, the first set of data 2 is a hash of the digital file, preferably generated by the SHA256 algorithm, the SHA3-256 algorithm, or the SHA3-512 algorithm. The hash may be generated using any other know cryptographic algorithm, which as an output gives a string of digits. This string of digits is a unique identifier of the digital file, where it is practically impossible to reverse the hashing function and recreate the digital file from the hash. Preferably the hash is generated using an Elliptic Curve Cryptography (ECC), in particular using the Secure Hash Algorithms, which are a family of cryptographic hash functions published by the National Institute of Standards and Technology (NIST) as the U.S. federal Information Processing Standard (FIPS), including: SHA-0: a retronym applied to the original version of the 160-bit hash function; SHA-1: a 160-bit hash function which resembles the earlier MD5 algorithm; SHA-2: a family of two similar hash functions, with different block sizes, known as SHA-256 and SHA-512; they differ in the word size: SHA-256 uses 32-bit words and SHA-512 uses 64-bit words; there are also truncated versions of each standard, known as SHA-224, SHA-384, SHA-512/224 and SHA-512/256; SHA-3: a hash function formerly called Keccak; it supports the same hash sizes as SHA-2 and its internal structure differs significantly from the rest of the SHA family; the corresponding standards are FIPS PUB 180 (original SHA), FIPS PUB 180-1 (SHA-1), FIPS PUB 180-2 (SHA-1, SHA-256, SHA-384 and SHA-512); NIST has updated Draft FIPS Publication 202, SHA-3 Standard separate from the Secure Hash Standard (SHS).

In the method according to the invention, the second set of data 3 comprises a digital signature of a hash of the digital file, preferably calculated as a function of: the hash of the digital file (or the digital file itself) and a private key corresponding to the origin of the digital file (called above the second private key), using one of the above-mentioned hash functions, preferably generated by the SHA256 algorithm, the SHA3-256 algorithm, or the SHA3-512 algorithm. Typically, the signature function is a function embodied in a blockchain protocol, which is used for signing blockchain transactions (for example, appropriate explanations for bitcoin can be found under https://en.bitcoin.it/wiki/Elliptic Curve_Digital Signature_Algorithm). The hash may be generated using any other known cryptographic algorithm which as an output gives a string of digits. Details are given in the earlier paragraph. A typical digital signature of a hash of a digital file is a function of the hash of this digital file and the private key of the signatory of the digital file. A public key corresponding to said private key of the signatory may be added to the second set of data 3.

When the second set of data 3 is the digital signature of a hash of the digital file, the second set of data 3 may have the size of 130 digits, preferably 130 hex digits (128 digits is a digital signature calculated using Elliptic Curve Cryptography, 2 digits is a prefix, added by the calculating node).

In a preferred embodiment of the method according to the invention, the following information is stored in a separate database, in relation to the first set of data 2: the transaction hash corresponding to the transaction generated in the step e), the block hash, the block height and block timestamp of registration, corresponding to the block mentioned in the step g). This data can be stored in a separate database on a server or computer connected permanently or temporary to the blockchain database. Said separate database can be copied or transferred and stored on a separate computer or server. The database can be modified in any possible way, it does not need to be an incremental database like blockchain is. Any operation on a record e.g. copying, writing, deleting, reading, editing, merging etc. may be possible. Said database can also store additional information relating to the digital file (digital good), e.g. file size, file type, file owner, file author, file version, file abstract, file contents, the whole digital good or file etc. The separate database can store additional information about the origin of the digital good, e.g. IP address of the node, blockchain address, ID or name of a user who is the author or the owner of said digital good, number of owners, time of sending to the blockchain, timestamp of registration of the block in the blockchain, blockchain type, etc. Of course, all this information can also be stored in the blockchain database itself. However, the advantage of registration of this information in the separate, preferably dedicated, database is the possibility of fast retrieval of this information when information about a particular digital file is sought, for example for the purpose of its verification. Retrieval of information from the dedicated, separate database may be much faster than from the blockchain database. Once retrieved from the separate database, the information may be used to find relevant blocks and transactions in the blockchain database, in which transactions the complete information about the contents and origin of the digital file has been stored, along with relevant timestamp of registration.

Therefore, the present invention proposes a method for verifying a test digital file, based on the registration method described above. Here "verification" means verification of the contents of the test digital file, verification of the origin of the digital file and the registration timestamp. The test digital file may be any digital document/digital file.

According to the invention, first a user provides a test digital file (test document) for verification. Verifying authenticity of the test digital file is carried out by calculating a hash of the test digital file and checking if this hash of the test digital file matches the first set of data 2 being the hash of the digital file, previously registered in the block of the blockchain database as the result of the data registration method described above. In the affirmative, a confirmation is sent to the user, who provided the test digital file. Said confirmation comprises information relating to the contents of the test digital file and optionally comprises information relating to the origin of the test digital file and/or information relating to the timestamp of registration of the block.

In other words, this verification method allows for verifying the following three important features of the test digital file:

WHAT—the contents of the test document.

WHO—the origin/owner of the test digital file. For example, in case that Elliptic Curve Cryptography (ECC) is used, in order to establish the owner (i.e. the signatory of the hash of the test document), the owner has to sign any random string with his private key, thereby creating a random string signature. Typically, the signature function is a function embodied in a blockchain protocol. Based on this random string signature one can calculate the public key corresponding to the private key of the owner. This is a known procedure, called Public Key Recovery Operation, described e.g. here: http://www.secg.org/sec1-v2.pdf In the same way, the public key can be calculated as a function of the signature of the hash of the test document. If the thus obtained public keys are identical—it is a confirmation that the same owner has signed both the test digital file and the aforementioned random string (or—more precisely: confirmation that in both cases the same private key was used for signature). Likewise, these public keys may be checked with the public key calculated as a function of the signature of the hash of the digital file, information above has been previously stored in the blockchain database or in the separate database, according to the data registration method of the present invention. This way verification of the owner of the file can be carried out.

WHEN—the timestamp of the registration of the relevant block in the blockchain database is checked and returned.

In a preferred embodiment of the invention, the user provides the test digital file through a web browser (e.g. by dragging and dropping a file to a field in a web form). Likewise, the results of verification procedure (confirmation), as described above, is preferably provided to the user through the web browser. However, other communication means may be used as an alternative or in parallel to the web browser. For example, the user can submit the test file for verification through a web browser and receive verification results by e-mail. Or the user may submit the test file for verification by e-mail and receive verification results by e-mail, etc.

In a preferred alternative embodiment of the verification method according to the present invention, similar steps are performed as described in the earlier paragraph (i.e. a user provides a test digital file for verification and hash of the test file is calculated), but then in the checking step it is checked if the hash of the test digital file matches the first set of data 2 being a hash of the digital file, previously stored in said separate database as the result of the aforementioned data registration method. In the affirmative—confirmation is sent to the user, similarly as described in the earlier paragraph.

Verification method in a situation when the hash of the test digital file matches more than one first sets of data in above described verification process: If the hash of the test digital file matches more than one first sets of data, then only information corresponding to the transaction bearing one selected timestamp is used as the basis to generate the confirmation to the user. In one embodiment said one selected timestamp is the oldest timestamp. This is a preferred option, but other embodiments cannot be excluded, e.g. in which all newer records would also be returned.

The aforementioned method can have a form of a computer program product, comprising program code stored on a computer readable medium, like a memory stick, a CD, a hard drive of a computer or an internet server or as asset of instructions stored on different servers, preferably a web tool product configured to preform said method on a user's computer or on a server having a user interface configured for user operations and a network interface for network connectivity, if necessary.

A preferred embodiment of the methods according to the present invention is described below. It should be understood that modifications of this embodiment are possible—in particular in view of the aforementioned teaching.

Procedure of Registering Data in Blockchain

The process begins with a user uploading data into memory of a user terminal. The data is acted on by the hashing function SHA-256. The SHA-256 is a publicly available algorithm for encoding data. This is a cryptographic hash function, the task of which is to map data of arbitrary size to a bit string of a size corresponding to the size of a standard data container used in this particular blockchain standard. In some blockchain standards such as bitcoin or dash the standard data container has its standard, fixed size (256 bits which equals to 64 hex characters). The key to producing this 64-character hash is the impossibility of recreating the data from the hash (one-direction operation) and the extreme improbability of any other data resulting in the same hash (collision resistance). After hashing, the data is removed from the memory of the user terminal and only the hash remains in the memory of the user terminal.

Hashing the data is followed by running the procedure of verification of data on blockchain using the hash as an input. If the data is found in the blockchain, the system operator decides whether or not the user is allowed to proceed with registration of data. If the system operator allows the user to continue or the hash was not found in the blockchain, the user is asked if he wants to proceed with recording data in the blockchain.

If the user chooses to continue, the hash of data is signed using user's private key (corresponding to the second private key mentioned earlier). The function of blockchain signature of the hash of the data is the publicly available ECDSA (Elliptic Curve Digital Signature Algorithm) function, corresponding to the keys generation function, that calculates the signature of the hash of the data from the hash of the data and the user's private key. The signature is a 128 hex characters long number and neither the user's private key nor the hash of the data can be calculated from it. The calculated signature is saved in the memory of the user terminal.

Producing the signature is followed by submitting the memory of the user terminal to memory of the system operator computer, using a secure API connection.

The system operator runs the function of checking if the signature of the hash of the data matches the user's public key. It is a publicly available function from the ECDSA family, the inputs of which are: the hash, the signature and the public key. The function reports a message (positive or negative) to the system operator. If it is negative, the message is forwarded to the user.

If the data from the memory of the user terminal is compatible—the system operator moves on to creating a blockchain transaction.

Creating Transaction

Creating the blockchain transaction comprises signing transaction inputs (i.e. unspent outputs of previous transactions) to this address and creating transaction outputs from the provided data and generating transaction script and its hash. It begins with the function of transaction signing and private key saving. This is a publicly available function that is a part of ECDSA. It signs the unspent transaction outputs that the system operator received with a corresponding private key (i.e. the first private key or the node's private key, mentioned earlier).

Signing the inputs is followed by constructing the outputs of the transaction that comprises the data that is intended to be permanently recorded in the blockchain network, which are: the hash of the data, the user's signature of hash of the data and optionally the unique user identifier and public note. This function begins with creating a long string of hexadecimal characters by connecting the following elements: the hash of the data, a separator (e.g. 01), the signature of hash, a separator (e.g. size of following element from 00 to ff), hex notation of the unique user identifier, a separator and lastly hex notation of the data public note. The generated string is afterwards cut into 40 characters (160 bit)

long sections and if necessary the last part is supplemented by zeros (or any other hex characters) to obtain the required size. Each of 40 hex character sections is the final hash160 of a fictional non-existent public key that will become the recipient of the currently created transaction. The particular order of data in the data frame described in this paragraph is given as an example. Any other order is acceptable—as long as the following data is included in the long string of hexadecimal characters: the hash of the data, the signature of hash and optionally hex notation of the unique user identifier. In any case the system operator must know the structure of the data frame (i.e. the order of data in the data frame) to be able to create it properly and read it properly later on (for example to perform verification).

Having generated the hash160s of outputs, the procedure moves to creating a standard P2PKH transaction script using the system operator's signature and system operator's public keys, corresponding to the previously signed outputs, for the input script and the previously generated hash 160 strings for the output script in which each output address receives a minimum allowed amount of cryptocurrency (e.g. for bitcoin it is 5430 Satoshis since bitcoin Core 0.14.1).

The script is acted upon by hash256 function. It is a publicly available algorithm for encoding data. Hash256 is a cryptographic hash function that maps data of arbitrary size to a bit string of a fixed size of 64 hex characters. The generated hash is saved in the memory of system operator.

Adding Transaction to Blockchain

Creating the transaction is followed by registering it in the blockchain. That begins with the function of transaction submitting to blockchain, which sends the previously created transaction script to blockchain nodes.

After a specified time (e.g. 30 minutes) the system operator checks if the transaction has been added to the blockchain by querying the blockchain node if the transaction has been added to recent blocks. If the answer is negative, then the system operator returns to the function of transaction submitting to blockchain. If the transaction has successfully been added to the blockchain, then the transaction details are imported from the blockchain into memory of the system operator computer.

These two sets of data are compared in the function of checking if the data from the blockchain matches the data from the database of the system operator (corresponding to the separate database mentioned earlier). If the function returns a negative message, it can be forwarded to the user. If the outcome of the function is positive (i.e. the data from the blockchain does not match the data from the database of the system operator), the transaction details are submitted to the database of the system operator.

It is a big advantage of the present invention that the registration (as described above) is carried out by the system operator, independent from the user, wherein the system operator does not see the data being registered by the present method. A digital document, whose data relating to its contents, origin/source and timestamp have been registered in the blockchain database according to the present method by a first entity may be safely transmitted between entities through a communication network. For example, the digital document can be transmitted from the first entity to a second entity via internet.

Procedure of Verification of Data in Blockchain

The procedure of verification begins with the user uploading the data to be verified in blockchain. The data provided is acted upon by the hash function SHA-256, the hash of the data is saved while the data itself may be deleted.

Having generated the hash, the procedure moves on to searching for it in the database of the system operator. It is done by running the function of checking if the hash of the data is contained in the database of system operator. It is a function, the task of which is to check if the hash of the data exists in the database. It asks the database if the hash is registered using suitable query. The function either reports a positive message to the user and/or system operator and uploads the data corresponding to the hash that where registered in that database, if the hash is present in the database, or reports a negative message to user and/or system operator otherwise.

If the message reported is positive, then the data assigned to the hash of the data is reported to the memory of the user terminal. Afterwards the user can decide whether or not to proceed with checking if the hash is present in the blockchain block that was specified in the system operator database. If the user decides to continue, the system operator runs the procedure of searching for the hash in specified block and checking integrity of data.

If the procedure returns a positive message, the user can choose to proceed with verification of ownership of the data. Then the procedure of identifying and verifying the owner of the data is called.

If the hash of the data has not been found in the database of the system operator or data in the block specified in that database does not match the data to be verified, the user can decide whether or not to proceed with checking if the hash has ever been registered in the blockchain. If the user chooses to continue, the function of checking if the hash of the data has been added to the blockchain is run. If the hash has been found in the blockchain, the database of the system operator is updated with information about the transactions in which this hash was found in the blockchain and the user can choose to proceed with verification of ownership.

Searching for Hash in Specified Block and Checking Integrity of Data

This procedure begins with function of checking if the hash of the data has been added to a specified blockchain block. It is a function meant to check whether the hash of the data is present in scripts of transactions in the blockchain block that was specified.

The function inputs are: the block details (blockchain identifier, block height and block hash) and the hash of the data.

The function queries the blockchain nodes (of the blockchain specified by the blockchain identifier) for the hashes of all transactions stored in the specified block. For each of received transaction hashes, the function asks for raw transaction script. From such script, hash160s of output public keys are retrieved and connected in order to receive one long hex string. The first n characters are the candidate for the hash of the data (where n is the size of the hash that the hash function generates, e.g. n=64 for SHA-256). If the candidate is equal to the original hash then a positive message is reported and the transaction data (i.e. the hash and it's raw script) in which the hash of the data was found is submitted to the memory of the system operator computer. If none of the candidates matches with the original hash, the function reports a negative message.

If a positive message has been reported, the system operator runs a function of checking if data from the database of the system operator matches with data from the blockchain, which function reports either a positive or negative message.

Function of Checking if Hash of Data has been Added to Blockchain

Function of checking if the hash of the data has ever been added to the blockchain is a function the purpose of which is to determine whether or not the hash has been ever registered in the blockchain. If the hash is found, the function should return the details of the block and transaction hash where the hash of the data is registered, such as e.g. the signature, the public key of the system operator, the public note.

This function's only input is the hash of the data to be verified.

For each blockchain database in which the system operator registers hashes of data, function queries the suitable blockchain nodes for hashes of all blocks. For every obtained block hash, the function queries the nodes for block details (e.g. block hash and block height).

The function proceeds by calling the function of checking if the hash of the data has been added to a specified blockchain block with the arguments: block details (blockchain identifier, block height, block hash) and the hash of the data. If the output is positive and a positive message and transaction data are returned, then the function reports a positive message and block details together with the transaction data. If the function of checking if the hash of the data has been added to a specified blockchain block reports a negative message, it is called for next block. If the hash is not found in any block in any of the blockchain databases, the function of checking if the hash of the data has ever been added to the blockchain reports a negative message.

Example of Application of the Aforementioned Methods: "One-Drop"

In the following a particularly useful application of the aforementioned methods of data registration and data verification is described. The digital file being registered in a blockchain database as described before and the test digital file being verified as described before is a particular document, called a "One-Drop" Document in the present example. The simplicity and advantages of the process presented here will be apparent in view of the regulations and procedures related to anti-money laundering, including the Onboarding Process, identifying the credit history and financial standings, as well as set forth below:

Anti-money laundering—the process of systems and controls that are applied to deter, disrupt and detect the flow of illicit value between collusive criminals that represents the proceeds of crimes and Predicate Offences such as tax evasion, sanctions evasion, theft, counterfeiting and fraud.

Onboarding Process—a process to assess all the risks associated with a client or relationship, including KYC, and that requires that the overall client conduct and transactions are assessed to determine if this is unusual and reportable. Onboarding Process requires that obliged entities assess the risks before entering in to a relationship, and continuously thereafter in response to trigger events or suspicious activity for example. It is a continual process that is designed to assess and monitor changes in customer risks.

Know Your Client (KYC)—the identification and verification of the natural person, legal entity or legal arrangement through identifying information, such as name and address, and the verification of these details to identify fraud, misrepresentations etc.

"One-Drop" Application Process Description:

1. The client ("Onboarding Subject") of a first entity ("Onboarding Provider", e.g. a bank) that conducted the Onboarding Process or that holds the Onboarding Subject's data for the Onboarding Process on this Onboarding Subject, transmits or downloads a "One-Drop" Document from a source node (e.g. a server of the Onboarding Provider) to a destination node (e.g. the Onboarding Subject's terminal), said "One-Drop" Document containing:
    (a) relevant personal data of the Onboarding Subject and
    (b) the Onboarding Subject's transaction history,
where information (a) and/or (b) is required by recipient of the data ('Onboarding Taker'), which may, after validating it in line with its requirements, use it for:
    (a) identifying the Onboarding Subject; or
    (b) identifying the Onboarding Subject's address for delivery; or
    (c) identifying the Onboarding Subject's credit history and financial standings; or
    (d) accepting the Onboarding Process performed by Onboarding Provider and consequently, relying in full or in part (in conformity with relevant provisions of law) on the results of Onboarding Process conducted by Onboarding Provider; or
    (e) setting up an account for the Onboarding Subject with the Onboarding Taker; or
    (f) relying on data included in "One-Drop" Document, such as name, address, history of transaction.
It is noted that the "One-Drop" Document mentioned here can be e.g. a bank statement or a similar document containing personal data of the Onboarding Subject and its transactions history on a bank account.

Onboarding Subject can be an Individual Person, Company or Other Legal Entity.

2. The Onboarding Provider registers the "One-Drop" Document in a blockchain database according to the method of registering data in a blockchain database provided in the present patent application. In this context the "One-Drop" Document corresponds to the digital file being registered in a blockchain database.

3. The Onboarding Subject provides the "One-Drop" Document to the Onboarding Taker. This can be done e.g. by transmitting or uploading the "One-Drop" Document from the destination node (e.g. the Onboarding Subject's terminal) to a second destination node (e.g. a server of the Onboarding Taker).

4. The Onboarding Taker being in possession of said "One-Drop" Document, verifies its authenticity (i.e. the issuer/owner, timestamp and contents), according to the method of data verification, provided in the present patent application. In this context the "One-Drop" Document corresponds to the test digital file being verified.

5. If—as the result of data verification process—it turns out that the "One-Drop" Document is authentic and contains all data required by the Onboarding Taker, the Onboarding Taker may consider the "One-Drop" Document as a valid and sufficient item for identification and authentication of data related to Onboarding Subject in order to:
    (a) identify the Onboarding Subject; or
    (b) identify the Onboarding Subject's address for delivery; or
    (c) identify the Onboarding Subject's credit history and financial standings; or (d) accept the Onboarding Process performed by Onboarding Provider and consequently, rely in full or in part (in conformity with relevant provisions of law) on the results of Onboarding Process conducted by Onboarding Provider; or
(e) set up an account for the Onboarding Subject with the Onboarding Taker; or
(f) rely on data included in "One-Drop" Document, such as name, address, history of transaction.

The "One-Drop" Document may be considered as authentic if:

(a) it was issued by an identified Onboarding Provider that may be considered as a trusted party for conducting the Onboarding Process, according to the applicable laws and regulations; and
(b) the contents of the document is valid and was not altered after generation from the system of Onboarding Provider;
(c) it was registered in said blockchain database (see step 2 of the process) within the appropriate timeframe if required by the Onboarding Taker, which is indicated by the timestamp.

Relying in full or at least in part on the Onboarding Process performed by the Onboarding Provider, based on a trustworthy document ("One-Drop" Document) generated by the Onboarding Provider and presented/provided by the Onboarding Subject (or—in other words: waiving in full or in part the Onboarding Process by the Onboarding Taker) saves a lot of work (and thus: resources such as staff, time spent and computational power) on the side of the Onboarding Taker. This is only possible if the One Drop Document is reliable, i.e. its source, contents and timestamp can be relied on. These three features (i.e. the source, the contents and the timestamp) of a document ("One Drop Document", being a digital file) are guaranteed by data registration and data verification methods provided in the present patent application.

The invention claimed is:

1. A method for registering of a digital document as a digital file in a blockchain database, in which database transactions are constructed of standard data containers which have a fixed size, in a system comprising one or more storage nodes for storing at least part of the blockchain database, one or more approval nodes for approving transactions in said blockchain database and a first computer for generating transactions in said blockchain database, said first computer having access to said blockchain database and having access to a first private key, comprising the following steps:

a) providing a first set of data (2), relating to the contents of the digital file;
b) providing a second set of data (3), relating to an origin of the digital file;
c) generating a third set of data (5) by merging the first set of data (2), the second set of data (3), a header (1) and a suffix (4) into a data frame, wherein the header (1) contains information about the structure of the third set of data, about the size of the first set of data (2), while the size of the suffix (4) is adjusted such that the size of the data frame is a multiple of the size of the standard data container used in said blockchain database;
d) dividing the third set of data (5) into an integer number N≥1 of parts of equal size, the size corresponding to the size of the standard data container used in said blockchain database;
e) generating—by said first computer or an intermediary computer connected to said first computer and said one or more of the approval nodes—a single blockchain transaction for all the N parts obtained in the step d), signing the transaction by said first private key and sending the transaction and a first public key matching the said first private key to said one or more approval nodes for approval;
f) obtaining approval for the transaction from said one or more approval nodes;
g) registering the transaction approved in the step f) in a block of said blockchain database with a timestamp of registration by the one or more storage nodes,
wherein the second set of data (3) comprises a digital signature of a hash of the digital file and wherein registering of the digital document as the digital file in said blockchain database is done
by a first entity and the digital document is transmitted from the first entity to a second entity.

2. The method according to claim 1, wherein the first set of data (2) is the digital file.

3. The method according to claim 1, wherein the first set of data (2) is a hash of the digital file, generated by the SHA256 algorithm, the SHA3-256 algorithm, or the SHA3-512 algorithm.

4. The method according to claim 3, wherein the first set of data (2) is the hash of the digital file generated by the SHA256 algorithm and has the size of 64 digits, 64 hex digits or a multiple thereof or is a hash of the digital file generated by the SHA3-256 algorithm and has the size of 64 digits, 64 hex digits or a multiple thereof, or is the hash of the digital file generated by the SHA3-512 algorithm and has the size of 128 digits, 128 hex digits or a multiple thereof.

5. The method according to claim 1, wherein the digital signature of the hash of the digital file comprised in the second set of data (3) is calculated as a function of: the hash of the digital file and a private key corresponding to the origin of the digital file.

6. The method according to claim 5, wherein the second set of data (3) is the digital signature of the hash of the digital file and has the size of 130 digits, 130 hex digits.

7. The method according to claim 1, wherein the header (1) has the size of 6 digits, 6 hex digits and comprises the following information: version of the digital file, type of the digital file, the number of hashes that are stored in the data frame generated for the third set of data, the number of signatories of the digital file.

8. The method according to claim 1, wherein the blockchain database is a dash database or a bitcoin database, and the standard data container has the size of 40 hex digits.

9. The method according to claim 1, in which the following information is stored in a separate database, in relation to the first set of data (2): a transaction hash corresponding to the transaction generated in the step e), the block hash, the block height and the block timestamp of registration, corresponding to the block mentioned in the step g).

10. The method according to claim 1, further comprising the steps of:

h1) providing a test digital file by a user, through a web browser;
i1) calculating a hash of the test digital file;
j1) checking if the hash of the test digital file matches the first set of data (2) being the hash of the digital file, previously stored in the block of the blockchain database as the result of the method according to claim 1, and in the affirmative sending confirmation to the user, through the web browser, said confirmation comprising information relating to the contents of the test digital file and comprising information relating to the origin of the test digital file and/or information relating to the block timestamp of registration.

11. The method according to claim 9, further comprising the steps of:
   h2) providing a test digital file by a user, through a web browser;
   i2) calculating a hash of the test digital file;
   j2) checking if the hash of the test digital file matches the first set of data (2) being the hash of the digital file, previously stored in said separate database as the result of the method according to claim 9, and in the affirmative sending confirmation to the user, through the web browser, said confirmation comprising information relating to the contents of the test digital file and comprising information relating to the origin of the test digital file and/or information relating to the block timestamp of registration.

12. The method according to claim 10, wherein if the hash of the test digital file matches more than one first sets of data in the step j1), then only information corresponding to the transaction bearing one selected timestamp of registration, the oldest timestamp of registration, is used as the basis to generate said confirmation to the user in the step j1).

13. The method according to claim 1 comprising:
   generating the digital document by the first entity,
   registering of the digital document as the digital file by the first entity in the blockchain database, according to claim 1,
   transmitting the digital document from the first entity to the second entity, through a user terminal, and
   verifying the digital document as the test digital file by the second entity according to claim 1.

14. The method according to claim 13, wherein the digital document contains personal data of a client and the client's transaction history, the digital file being a bank statement or a similar document containing personal data of the client and transactions history on a bank account of the client.

15. A computer program product comprising program code stored on a computer readable medium, said program code comprising computer instructions for performing the method according to claim 1.

16. The method according to claim 11, wherein if the hash of the test digital file matches more than one first sets of data in the step j2), then only information corresponding to the transaction bearing one selected timestamp of registration, the oldest timestamp of registration, is used as the basis to generate said confirmation to the user in the step j2).

17. The method according claim 1 comprising:
   generating the digital document by the first entity,
   registering of the digital document as the digital file by the first entity in the blockchain database, according to claim 1,
   transmitting the digital document from the first entity to the second entity, through a user terminal, and
   verifying the digital document as the test digital file by the second entity according to claim 1.

* * * * *